United States Patent
Ochi et al.

(10) Patent No.: US 9,128,220 B2
(45) Date of Patent: Sep. 8, 2015

(54) LIGHT GUIDE BODY WITH CONTINUOUSLY VARIABLE REFRACTIVE INDEX, AND DEVICES USING SUCH BODY

(75) Inventors: Takashi Ochi, Osaka (JP); Masakazu Shibasaki, Osaka (JP); Iori Aoyama, Osaka (JP); Yuichi Iyama, Osaka (JP); Katsuhiro Kikuchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 63 days.

(21) Appl. No.: 13/989,947

(22) PCT Filed: Nov. 25, 2011

(86) PCT No.: PCT/JP2011/077181
§ 371 (c)(1),
(2), (4) Date: May 28, 2013

(87) PCT Pub. No.: WO2012/073819
PCT Pub. Date: Jun. 7, 2012

(65) Prior Publication Data
US 2013/0242610 A1    Sep. 19, 2013

(30) Foreign Application Priority Data
Nov. 29, 2010  (JP) ................................. 2010-265801

(51) Int. Cl.
    G02B 6/00    (2006.01)
    F21V 8/00    (2006.01)
    G02F 1/1335  (2006.01)

(52) U.S. Cl.
    CPC ............... *G02B 6/0011* (2013.01); *G02B 6/00* (2013.01); *G02B 6/0033* (2013.01); *G02B 6/0038* (2013.01); *G02B 6/0061* (2013.01); *G02B 6/0076* (2013.01); *G02F 1/133615* (2013.01)

(58) Field of Classification Search
    CPC combination set(s) only.
    See application file for complete search history.

(56) References Cited

U.S. PATENT DOCUMENTS

| | | |
|---|---|---|
| 3,639,035 A | 2/1972 | Irie |
| 3,819,782 A | 6/1974 | Irie |
| 3,955,015 A | 5/1976 | Ohtsuka et al. |

(Continued)

FOREIGN PATENT DOCUMENTS

| | | |
|---|---|---|
| CN | 101403483 A | 4/2009 |
| JP | 47-26913 B | 7/1972 |

(Continued)

OTHER PUBLICATIONS

International Search Report PCT/ISA/210 for International Application No. PCT/JP2011/077181 Dated Feb. 9, 2012.

(Continued)

*Primary Examiner* — Ismael Negron
(74) *Attorney, Agent, or Firm* — Harness, Dickey & Pierce, P.L.C.

(57) ABSTRACT

A light guiding element has a first principal surface, a second principal surface which opposes the first principal surface, a first lateral surface which intersects with the first principal surface and the second principal surface, and a second lateral surface which opposes the first lateral surface. The light guiding element allows light incoming from the first lateral surface to propagate between the first principal surface and the second principal surface. The light guiding element includes a portion in which a refractive index varies substantially continuously from the first principal surface toward the second principal surface.

18 Claims, 2 Drawing Sheets

(56) References Cited

U.S. PATENT DOCUMENTS

| | | | |
|---|---|---|---|
| 5,899,552 A * | 5/1999 | Yokoyama et al. | 362/619 |
| 6,359,735 B1 | 3/2002 | Gombert et al. | |
| 6,592,233 B1 * | 7/2003 | Parikka | 362/603 |
| 7,252,427 B2 * | 8/2007 | Teng et al. | 362/626 |
| 7,253,853 B2 * | 8/2007 | Imamura et al. | 362/603 |
| 7,265,800 B2 * | 9/2007 | Jagt et al. | 349/61 |
| 7,448,787 B2 * | 11/2008 | Kim et al. | 362/620 |
| 7,708,448 B2 | 5/2010 | Lee et al. | |
| 7,796,212 B2 * | 9/2010 | Hwang et al. | 349/65 |
| 7,841,758 B2 * | 11/2010 | Lai | 362/606 |
| 7,927,003 B2 * | 4/2011 | Chang | 362/624 |
| 2003/0205475 A1 | 11/2003 | Sawitowski | |
| 2005/0213914 A1 * | 9/2005 | Fredley et al. | 385/129 |
| 2006/0146573 A1 | 7/2006 | Iwauchi et al. | |
| 2007/0159698 A1 | 7/2007 | Taguchi et al. | |
| 2010/0135038 A1 * | 6/2010 | Handschy et al. | 362/606 |
| 2012/0325670 A1 | 12/2012 | Nakamatsu et al. | |
| 2013/0182200 A1 * | 7/2013 | Ishizumi | 349/65 |
| 2014/0119056 A1 * | 5/2014 | Chang et al. | 362/625 |

FOREIGN PATENT DOCUMENTS

| | | |
|---|---|---|
| JP | 47-28059 B | 7/1972 |
| JP | 52-5857 B | 2/1977 |
| JP | 54-30301 B | 9/1979 |
| JP | 56-37521 B | 9/1981 |
| JP | 57-29682 B | 6/1982 |
| JP | 9-269416 A | 10/1997 |
| JP | 2001517319 A | 10/2001 |
| JP | 2003531962 A | 10/2003 |
| JP | 2003-344855 A | 12/2003 |
| JP | 2005156695 A | 6/2005 |
| JP | 2006-147420 A | 6/2006 |
| JP | 2009-224253 A | 10/2009 |
| WO | WO-2004-055429 A1 | 7/2004 |
| WO | WO-2006059686 A1 | 6/2006 |
| WO | WO-2011-111697 A1 | 9/2011 |

OTHER PUBLICATIONS

International Preliminary Report on Patentability dated Jun. 13, 2013.

* cited by examiner

LIGHT GUIDE BODY WITH CONTINUOUSLY VARIABLE REFRACTIVE INDEX, AND DEVICES USING SUCH BODY

TECHNICAL FIELD

The present invention relates to a light guiding element, and an lighting device and display device which include a light guiding element.

BACKGROUND ART

A non-self-emitting display device, such as a liquid crystal display device, for example, includes an lighting device called a backlight or frontlight. The backlight is provided on the rear side of a liquid crystal display panel. Light which is emitted from the backlight and transmitted through the liquid crystal display panel is used for display. The frontlight is provided on the viewer side (front side) of the liquid crystal display panel. Light which is transmitted through a liquid crystal layer of the liquid crystal display panel and then reflected toward the viewer side is used for display.

An example of these lighting devices is an edge light type lighting device. The edge light type lighting device includes a light source and a light guide plate (a light guiding element in the form of a plate). In recent years, particularly, lighting devices in which a LED is used as the light source have been widely used. One or a plurality of LEDs are provided at one lateral surface or corner of a transparent light guiding element. Light emitted from the LEDs enters the light guiding element at the one lateral surface and propagates inside the light guiding element, before outgoing from the light guiding element. The ratio between the light propagating inside the light guiding element and the light outgoing from the light guiding element is adjusted according to, for example, the shape and density of recessed or raised portions formed in the surface of the light guiding element. For example, a minute prism pattern is formed across the viewer side surface of the light guiding element of the frontlight, so that light which is totally reflected at the interface between the light guiding element and the air propagates inside the light guiding element, and light which does not meet the total reflection conditions outgoes to the viewer side. By adjusting the angle of the slope surface of the minute prism and the length of the slope surface, the ratio between the propagating light and the outgoing light is determined.

Patent Documents 1 and 2 disclose light guiding elements which do not have a minute prism pattern in the surface. These light guiding elements have a plurality of light guiding layers (light guiding element pieces) which have different refractive indices, and the plurality of light guiding layers are arranged so as to form interfaces which are inclined with respect to the principal surface of the light guiding element. Part of light incoming from the lateral surface of the light guiding element is refracted at the interfaces so that the traveling direction of the light is changed, and for example, the light outgoes from the principal surface on the display panel side. Another part of the light incoming from the lateral surface of the light guiding element is reflected a plurality of times inside the light guiding element and by a reflection plate, and then refracted at the interfaces, before outgoing from the principal surface on the display panel side.

On the other hand, the applicant of the present application developed an antireflection film which has a moth-eye structure (sometimes referred to as "moth-eye type antireflection film"). The moth-eye structure has minute raised portions (which have a conical or bell-like shape), and the effective refractive index continuously varies. Therefore, the reflectance can be decreased to a level which is less than 1% and, furthermore, to a level which is not more than 0.2%. Further, the moth-eye type antireflection film is capable of preventing reflection over a wide wavelength range of light and has a wide incidence angle range as compared with an antireflection film which is manufactured with the use of a dielectric multilayer film (Patent Documents 3 to 6). One of the moth-eye structure fabrication methods which uses an anodized porous alumina layer that is obtained by anodization of aluminum is excellent in mass-productivity (Patent Documents 4 to 6). It is preferred that, in a moth-eye structure which is suitable for an antireflection film, the two-dimensional size of the raised portions (the diameter of the raised portions which have a conical or bell-like shape) is not less than 10 nm and not more than 500 nm, the distance between adjacent raised portions is also not less than 10 nm and not more than 500 nm, the height of the raised portions is not less than 100 nm and not more than 500 nm, and the two-dimensional distribution of the raised portions has no regularity. The entire disclosures of Patent Documents 3 to 6 are incorporated by reference in this specification.

Patent Document 7 discloses a light guiding element for front light, which has a moth-eye structure over its surface.

CITATION LIST

Patent Literature

Patent Document 1: Japanese Laid-Open Patent Publication No. 9-269416
Patent Document 2: Japanese Laid-Open Patent Publication No. 2009-224253
Patent Document 3: Japanese PCT National Phase Laid-Open Publication No. 2001-517319
Patent Document 4: Japanese PCT National Phase Laid-Open Publication No. 2003-531962
Patent Document 5: Japanese Laid-Open Patent Publication No. 2005-156695
Patent Document 6: WO 2006/059686
Patent Document 7: Japanese Laid-Open Patent Publication No. 2003-344855

SUMMARY OF INVENTION

Technical Problem

However, the light guiding element disclosed in Patent Document 1 or 2 utilizes not only refraction but also reflection at the interfaces inside the light guiding element, and therefore, disadvantageously, the light utilization efficiency cannot be improved. Particularly when the light guiding element disclosed in Patent Document 1 or 2 is used as a frontlight, light incoming from the viewer side to be incident on the light guiding element is reflected by the interfaces inside the light guiding element, and therefore, the light utilization efficiency is low. In the light guiding element disclosed in Patent Document 1 or 2, disadvantageously, it is difficult to control the light distribution.

Even when a moth-eye structure is formed in the surface of the light guiding element as disclosed in Patent Document 7, only the surface reflection can be prevented while the reflection by the interfaces inside the light guiding element cannot be prevented.

The present invention was conceived for the purpose of solving the above problems. One of the objects of embodiments of the present invention is to provide a light guiding element of high light utilization efficiency in which reflection by the interfaces inside the light guiding element is prevented, and an lighting device and display device which include such a light guiding element.

Solution to Problem

A light guiding element of an embodiment of the present invention is a light guiding element having a first principal surface, a second principal surface which opposes the first principal surface, a first lateral surface which intersects with the first principal surface and the second principal surface, and a second lateral surface which opposes the first lateral surface, the light guiding element being capable of allowing light incoming from the first lateral surface to propagate between the first principal surface and the second principal surface, wherein the light guiding element includes a portion in which a refractive index varies substantially continuously from the first principal surface toward the second principal surface.

In one embodiment, the light guiding element has a plurality of raised portions which are two-dimensionally arranged between the first principal surface and the second principal surface. A two-dimensional size of the plurality of raised portions is not less than 10 nm and not more than 500 nm, and a distance between adjacent ones of the plurality of raised portions is not less than 10 nm and not more than 500 nm.

In one embodiment, the plurality of raised portions are protruding from the second principal surface toward the first principal surface.

In one embodiment, gaps between adjacent raised portions are filled with a material whose refractive index is lower than that of a material of the plurality of raised portions. In this case, it is preferred that the first principal surface is a flat surface.

In one embodiment, gaps between plural ones of the plurality of raised portions which are provided on a side that is closest to the first principal surface are filled with air.

In one embodiment, the light guiding element includes a plurality of light guiding layers between the first principal surface and the second principal surface, the plurality of light guiding layers including a first light guiding layer and a second light guiding layer which is provided on a second principal surface side of the first light guiding layer, wherein each of the first and second light guiding layers has the plurality of raised portions, and a refractive index n1 of the raised portions of the first light guiding layer is smaller than a refractive index n2 of the raised portions of the second light guiding layer (n1<n2).

In one embodiment, a volume proportion of the plurality of raised portions is greater on the second lateral surface side than on the first lateral surface side.

In one embodiment, a height of the plurality of raised portions is greater on the second lateral surface side than on the first lateral surface side.

In one embodiment, a number of the plurality of raised portions is greater on the second lateral surface side than on the first lateral surface side.

In the case where light enters from both of the first lateral surface and the second lateral surface, the volume proportion of the plurality of raised portions is greater in a middle region between the first lateral surface side and the second lateral surface side. In this case, the height of the plurality of raised portions is greater in a middle region between the first lateral surface side and the second lateral surface side, or the number of the plurality of raised portions is greater in a middle region between the first lateral surface side and the second lateral surface side.

A lighting device of an embodiment of the present invention includes: any of the above-described light guiding elements; and a light source which is provided so as to emit light toward the first lateral surface of the light guiding element.

A display device of an embodiment of the present invention includes: the above-described lighting device; and a display panel. The display panel is, for example, a liquid crystal display panel.

In one embodiment, the lighting device is provided on a viewer side of the display panel. The display panel is, for example, a reflective liquid crystal display panel.

Advantageous Effects of Invention

According to embodiments of the present invention, a light guiding element of high light utilization efficiency in which reflection by the interfaces inside the light guiding element is prevented, and a lighting device and display device which include such a light guiding element can be provided.

DESCRIPTION OF EMBODIMENTS

Hereinafter, a light guiding element, a lighting device, and a display device according to embodiments of the present invention are described with reference to the drawings. In the following, a display device in which a reflective liquid crystal display panel is used and a frontlight which is for use in the display device are illustrated as examples, and a light guiding element which is for use in these devices is described, although the present invention is not limited to illustrated embodiments. For example, it may be used for a frontlight or backlight of a transflective liquid crystal display device or may be used for a backlight of a transmissive liquid crystal display device. As a matter of course, it may also be used for other display devices than the liquid crystal display device, such as electrophoretic display devices, bicolor rotational microparticle (twist ball) display devices, toner display type display devices, etc. A light guiding element or lighting device of the present invention may be used for other uses than the display device.

Figure 1:
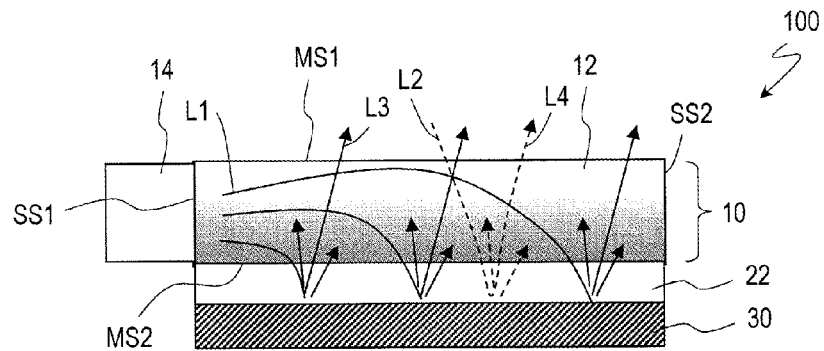
FIG. 1 A schematic cross-sectional view of a liquid crystal display device 100 of an embodiment of the present invention.

Now, the configuration of a liquid crystal display device 100 of an embodiment of the present invention is described with reference to FIG. 1. FIG. 1 is a schematic cross-sectional view of the liquid crystal display device 100. The liquid crystal display device 100 includes a reflective liquid crystal display panel 30 and a lighting device (frontlight) 10. The lighting device 10 includes a light guiding element 12 and a light source 14. The light guiding element 12 is placed over the viewer side surface of the reflective liquid crystal display panel 30 via an adhesive layer 22.

According to an embodiment of the present invention, the light guiding element 12 has a first principal surface MS1, a second principal surface MS2 which opposes the first principal surface MS1, a first lateral surface SS1 which intersects with the first principal surface and the second principal surface, and a second lateral surface SS2 which opposes the first lateral surface SS1. The light guiding element 12 is configured such that light incoming from the first lateral surface SS1 propagates between the first principal surface MS1 and the second principal surface MS2. The light guiding element 12 has a portion in which the refractive index varies substantially continuously from the first principal surface MS1 toward the second principal surface MS2. The light guiding element 12 illustrated herein has a refractive index distribution in which the refractive index increases substantially continuously from the first principal surface MS1 toward the second principal surface MS2 across the entirety of the light guiding element 12. That is, an interface which can refract or reflect light, such as those of the light guiding element disclosed in Patent Document 1 or 2, is not present inside the light guiding element 12. Therefore, the problems which have been described above as for the light guiding element disclosed in Patent Document 1 or 2 can be dissolved. In the example described herein, the light guiding element 12 has a refractive index distribution in which the refractive index increases substantially continuously from the first principal surface MS1 toward the second principal surface MS2 across the entirety of the light guiding element 12. However, so long as at least a portion of the light guiding element 12 has a refractive index distribution in which the refractive index varies substantially continuously from the first principal surface MS1 toward the second principal surface MS2, the above-described effects can be achieved in that portion, as a matter of course.

The light guiding element 12 can be manufactured using, for example, a manufacturing method of a gradient index lens or a light guiding path. Known examples of these manufacturing methods are described below.

According to the manufacturing method disclosed in Japanese Patent Publication for Opposition No. 47-26913, a synthetic resin circular pole which is made of an ionic crosslinking polymer is configured such that the metal ion concentration is continuously varied from the central axis toward the surface. According to the manufacturing method disclosed in Japanese Patent Publication for Opposition No. 47-28059, a synthetic resin circular pole that is made of a mixture of two or more types of transparent polymers which have different refractive indices is treated with a solvent such that at least one type of the constituents of the synthetic resin pole is partially dissolved away, whereby the mixture ratio of the polymers is varied from the center toward the perimeter of the circular pole so as to obtain a varying refractive index distribution. According to the manufacturing method disclosed in Japanese Patent Publication for Opposition No. 54-30301, the mixture of two types of monomers which have different refractive indices is put into a circular cylindrical container, and polymerization of the monomers is controlled such that the composition of the polymer in the form of a circular pole is varied from the center toward the surface, thereby obtaining a varying refractive index distribution. According to the manufacturing method disclosed in Japanese Patent Publications for Opposition Nos. 52-5857 and 56-37521, a monomer is diffused from the surface of a circular pole which is made of a cross-linked polymer, the monomer being capable of forming a polymer which has a lower refractive index than that of the cross-linked polymer, wherein the monomer is distributed such that the content of the monomer is continuously varied from the surface to the inside, and thereafter, the monomer is polymerized to obtain an optical transmitter which has a varying refractive index distribution. According to the manufacturing method disclosed in Japanese Patent Publication for Opposition No. 57-29682, a low molecular weight compound is diffused from the surface of a polymer circular pole which has reactivity, the low molecular weight compound having a lower refractive index than a polymer and having a functional group which can react with the reactive polymer, and a reaction of the diffused compound is caused such that the concentration of the low molecular weight compound is continuously varied from the surface to the inside of the polymer circular pole, whereby a varying refractive index distribution is formed.

Note that, in the example illustrated herein, each of the first principal surface MS1 and the second principal surface MS2 is a flat surface, and the first principal surface MS1 and the second principal surface MS2 are parallel to each other, although the light guiding element 12 may have a wedge-like cross-sectional shape as is well known in the art. For example, the second principal surface MS2 may be inclined such that the cross section has a wedge-like shape. For example, when there is a low refractive index interface, such as an air layer, between the light guiding element 12 and the liquid crystal display panel 30 (i.e., total reflection can occur) and, at the same time, irrespective of whether reflection occurs at the first principal surface MS1, it is difficult to sufficiently change the angle of light incoming from the first lateral surface SS1 inside the light guiding element 12 (e.g., due to restrictions as to the external shape and the manufacturing method), inclining the second principal surface MS2 enables efficient extraction of light from the light guiding element 12.

The light source 14 is provided so as to emit light toward the first lateral surface SS1 of the light guiding element 12. Light L1 incoming from the first lateral surface SS1 of the light guiding element 12 is refracted according to the refractive index distribution of the light guiding element 12 and outgoes from the second principal surface MS2 toward the viewer side surface of the reflective liquid crystal display panel 30. The light outgoing from the second principal surface MS2 of the light guiding element 12 is reflected by the reflective liquid crystal display panel 30 and then passes through the light guiding element 12 to outgo toward the viewer (light L3). Here, for the sake of simplicity, the light is illustrated as being reflected by the surface of the reflective liquid crystal display panel 30, although the light L3 represents light which is reflected for display by, for example, a reflection electrode (not shown) of the reflective liquid crystal display panel 30. Note that, by making the refractive index of the adhesive layer 22 equal to the refractive index of the viewer side surface of the reflective liquid crystal display panel 30, reflection at the viewer side surface of the liquid crystal display panel 30 can be prevented. Further, by making the refractive index at the second principal surface MS2 of the light guiding element 12 equal to the refractive index of the adhesive layer 22, the reflectance at the interface between the second principal surface MS2 and the adhesive layer 22 can be decreased.

The light source 14 is, for example, a LED or a cold cathode fluorescent lamp (CCFL). When the LED is used, a plurality of LEDs may be aligned in a row along the first lateral surface SS1 of the light guiding element 12 that has the shape of a plate. When necessary, a reflector plate may be provided such that light emitted from the LED or CCFL is efficiently emitted toward the first lateral surface SS1 of the light guiding element 12.

The light guiding element 12 has such a refractive index distribution that the refractive index is lower on the first principal surface MS1 side and is higher on the second principal surface MS2 side. Therefore, the reflectance at the first principal surface MS1 for light from the environment which is incident on the light guiding element 12 is smaller than in a conventional common light guiding element. Thus, the proportion of ambient light L2 that enters the light guiding element 12 from the first principal surface MS1 of the light guiding element 12 is large. Further, since an interface which can refract or reflect light, such as those of the light guiding element disclosed in Patent Document 1 or 2, is not present inside the light guiding element 12, a loss of light which is attributed to reflection at such an interface would not occur.

Thus, the reflective liquid crystal display device 100 that includes the lighting device 10 that includes the light guiding element 12 can provide high quality display as compared with the conventional devices. When the light guiding element 12 of the present embodiment is used, the lighting device 10 does not need to be removed even in a fine-weather outdoor environment because the surface reflectance of the light guiding element 12 is small. It is preferred that the lighting device 10 is secured to the display panel 30 using an adhesive agent or the like. As a matter of course, the lighting device 10 may be detachable from the display panel 30. For example, when the ambient light is intense (in a fine-weather outdoor environment), the lighting device 10 may be removed.

Next, light guiding elements of embodiments which employ moth-eye structures, and lighting devices and display devices which include such light guiding elements are described with reference to FIG. 2 to FIG. 5. In FIG. 2 to FIG. 5, elements which are equivalent to those of the liquid crystal display device 100 shown in FIG. 1 are designated by the same reference numerals, and detailed descriptions thereof are sometimes omitted. The liquid crystal display devices 100A to 100D at least perform the same functions and provide the same effects as those of the liquid crystal display device 100.

Figure 2:
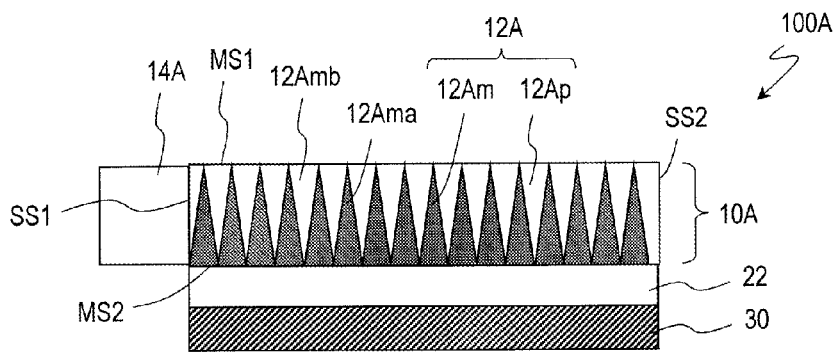
FIG. 2 A schematic cross-sectional view of a liquid crystal display device 100A of another embodiment of the present invention.

FIG. 2 shows a schematic cross-sectional view of the liquid crystal display device 100A of another embodiment of the present invention. A lighting device 10A, which is included in the liquid crystal display device 100A shown in FIG. 2, includes a light guiding element 12A and a light source 14A. The light source 14A is, for example, a LED or CCFL as is the above-described light source 14.

The light guiding element 12A includes a plurality of raised portions 12Am which are two-dimensionally arranged between the first principal surface MS1 and the second principal surface MS2. The plurality of raised portions 12Am are protruding from the second principal surface MS2 toward the first principal surface MS1. The two-dimensional size of the plurality of raised portions 12Am is not less than 10 nm and not more than 500 nm. The distance between adjacent ones of the plurality of raised portions 12Am is not less than 10 nm and not more than 500 nm. The gaps between the plurality of raised portions 12Am are a plurality of recessed portions 12Ap. The height of the raised portions 12Am is, for example, from 0.5 mm to 20 mm. The plurality of raised portions 12Am included in the light guiding element 12A has a moth-eye structure which functions as an excellent antireflection film for visible light (wavelength: 380 nm to 780 nm). It is preferred that the two-dimensional arrangement of the plurality of raised portions has no regularity. In the illustrated example, each of the raised portions 12Am has a conical shape, although it may be a bell-like shape. The shape of the raised portions may be appropriately modified. The moth-eye structure is optically equivalent to a structure in which the refractive index increases substantially continuously from the first principal surface MS1 side toward the second principal surface MS2. An interface which can refract or reflect light is not present inside the light guiding element 12A.

Thanks to the antireflection function of the above-described moth-eye structure, for example, 99.8% or more of ambient light that is incident on the first principal surface MS1 of the light guiding element 12A enters the light guiding element 12A, without being reflected by the first principal surface MS1. Further, since an interface which can refract or reflect incident light is not present inside the light guiding element 12A, light that comes into the light guiding element 12A is used for reflective display which is provided by the display panel 30.

The light guiding element 12A can be manufactured using a moth-eye mold that is obtained by repeating the step of anodizing aluminum so as to form a porous alumina layer and then the step of etching the porous alumina layer so as to enlarge recessed portions (micropores) of the porous alumina layer as disclosed in Patent Documents 4 to 6, for example. The anodization step can grow (deepen) the recessed portions, and the etching step can enlarge the recessed portions. By controlling the conditions for the anodization step (electrolytic solution type, temperature, voltage, duration, etc.), the depth of the recessed portions, the distance between adjacent recessed portions (or the pitch of the recessed portions when they have regularity), etc., can be adjusted. Further, by controlling the conditions for the etching step (etching solution type, temperature, duration, etc.), the degree of enlargement of the recessed portions can be adjusted. By controlling the conditions for the anodization step and the etching step and the repetition conditions, the depth of the recessed portions, the distance between adjacent recessed portions, the shape and depth of the recessed portions can be adjusted. By curing a curable resin (e.g., UV-curable resin) which is supplied so as to fill the recessed portions of the moth-eye mold, the light guiding element 12A can be formed.

From the viewpoint of antireflection, it is preferred that the recessed portions 12Ap are physical recessed portions and are filled with air (atmosphere), although it may be configured such that the raised portions 12Am of the light guiding element 12A are made of a material 12Ama, and the recessed portions 12Ap of the light guiding element 12A are filled with a material 12Amb. Note that, however, the refractive index of the material 12Amb is smaller than that of the material 12Ama. When such a configuration is employed, the first principal surface MS1 can be a flat surface. As described herein, in the light guiding element 12A that has a moth-eye structure, the recessed portions 12Ap do not need to be physical recessed portions but may be filled with a material whose refractive index is lower than that of the material of the raised portions 12Am. Thus, herein, they are referred to as "recessed portions 12Ap" irrespective of whether or not they are filled with a material. Further, in the present embodiment, the recessed portions 12Ap may be spaces which are defined as gaps between adjacent raised portions 12Am. Typically, uninterrupted spaces extending between the plurality of raised portions 12Am correspond to the plurality of recessed portions 12Ap.

Figure 3:
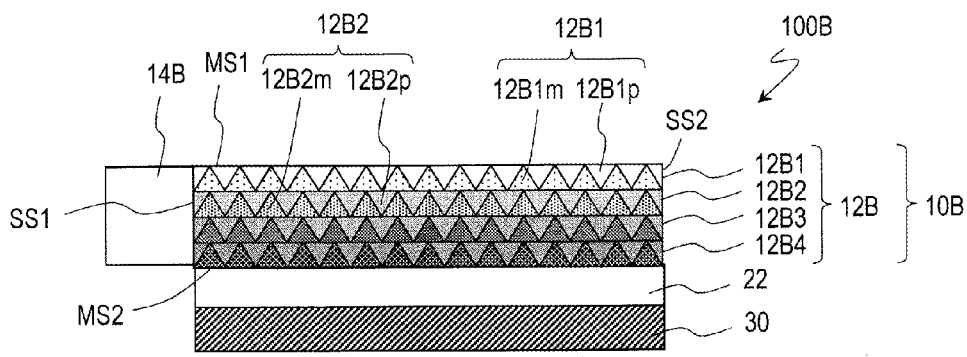
FIG. 3 A schematic cross-sectional view of a liquid crystal display device 100B of still another embodiment of the present invention.

FIG. 3 shows a schematic cross-sectional view of the liquid crystal display device 100B of still another embodiment of the present invention. A lighting device 10B, which is included in the liquid crystal display device 100B shown in FIG. 3, includes a light guiding element 12B and a light source 14B. The light source 14B is, for example, a LED or CCFL as is the above-described light source 14.

The light guiding element 12B includes a plurality of light guiding layers 12B1, 12B2, 12B3, and 12B4 between the first principal surface MS1 and the second principal surface MS2. The number of light guiding layers included in the light guiding element 12B is not limited to four but may be any number which is not less than two. Each of the plurality of light guiding layers 12B1, 12B2, 12B3, and 12B4 has a plurality of raised portions (e.g., raised portions 12B1m, raised portions 12B2m) which are two-dimensionally arranged. Each of the plurality of light guiding layers 12B1, 12B2, 12B3, and 12B4 has the same configuration as that of the light guiding element 12A shown in FIG. 2. The plurality of raised portions are protruding from the second principal surface MS2 toward the first principal surface MS1. For example, the two-dimensional size of a plurality of raised portions 12B1m of the light guiding layer 12B1 is not less than 10 nm and not more than 500 nm. The distance between adjacent ones of the plurality of raised portions 12B1m is not less than 10 nm and not more than 500 nm. The gaps between the plurality of raised portions 12B1m are a plurality of recessed portions 12B1p. The two-dimensional size of a plurality of raised portions 12B2m of the light guiding layer 12B2 is not less than 10 nm and not more than 500 nm. The distance between adjacent ones of the plurality of raised portions 12B2m is not less than 10 nm and not more than 500 nm. The gaps between the plurality of raised portions 12B2m are a plurality of recessed portions 12B2p. Note that the plurality of recessed portions 12B1p are typically connected with one another, and the plurality of recessed portions 12B2p are also typically connected with one another.

Here, in the light guiding layer 12B1 that is closest to the first principal surface MS1, the gaps between the plurality of raised portions 12B1m, i.e., the recessed portions 12B1p, are preferably filled with air from the viewpoint of antireflection, although the recessed portions 12B1p may be filled with a material whose refractive index is smaller than the refractive index $n_1$ of the material of the raised portions 12B1m.

In the light guiding layer 12B2 that is provided immediately below the light guiding layer 12B1, the refractive index $n_2$ of the material of the raised portions 12B2m is greater than the refractive index $n_1$ of the material of the raised portions 12B1m of the light guiding layer 12B1 ($n_2 > n_1$). The refractive index of the material that fills the recessed portions 12B2p of the light guiding layer 12B2 is generally equal to the refractive index $n_1$ of the material of the raised portions 12B1m. Such a configuration realizes a structure in which the refractive index varies substantially continuously from the first principal surface MS1 side surface of the light guiding layer 12B1 to the second principal surface MS2 side surface of the light guiding layer 12B2. By configuring the light guiding layer 12B3 so as to satisfy the same relationship with respect to the light guiding layer 12B2 and configuring the light guiding layer 12B4 so as to satisfy the same relationship with respect to the light guiding layer 12B3, the light guiding element 12B is realized in which the refractive index varies substantially continuously from the first principal surface MS1 toward the second principal surface MS2.

Figure 4:
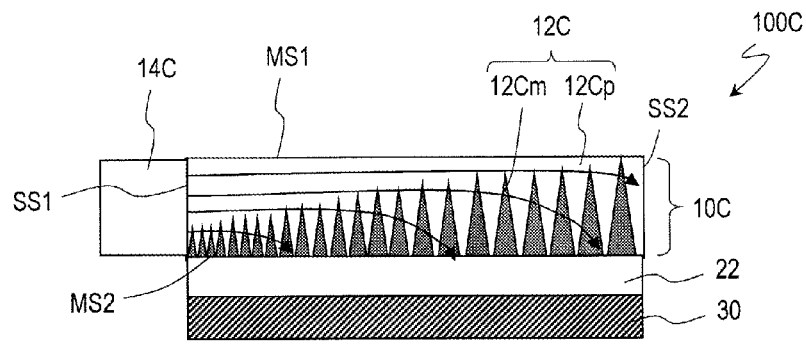
FIG. 4 A schematic cross-sectional view of a liquid crystal display device 100C of still another embodiment of the present invention.

FIG. 4 shows a schematic cross-sectional view of the liquid crystal display device 100C of still another embodiment of the present invention. A lighting device 10C, which is included in the liquid crystal display device 100C shown in FIG. 4, includes a light guiding element 12C and a light source 14C. The light source 14C is, for example, a LED or CCFL as is the above-described light source 14.

The light guiding element 12C includes a plurality of raised portions 12Cm which are two-dimensionally arranged between the first principal surface MS1 and the second principal surface MS2, as does the light guiding element 12A. The plurality of raised portions 12Cm are protruding from the second principal surface MS2 toward the first principal surface MS1. The two-dimensional size of the plurality of raised portions 12Cm is not less than 10 nm and not more than 500 nm. The distance between adjacent ones of the plurality of raised portions 12Cm is not less than 10 nm and not more than 500 nm. The gaps between the plurality of raised portions 12Cm are a plurality of recessed portions 12Cp. The recessed portions 12Cp of the light guiding element 12C may be filled with air or may be filled with a material whose refractive index is smaller than the refractive index of the material of the raised portions 12Cm.

Here, in the light guiding element 12C, the volume proportion of the plurality of raised portions 12Cm is greater on the second lateral surface SS2 side than on the first lateral surface SS1 side (the light source 14 side) as is not the case with the light guiding element 12A. For example, the volume proportion of the plurality of raised portions 12Cm continuously varies from 0% to 75%, from the first lateral surface SS1 side to the second lateral surface SS2 side. Specifically, as shown in the drawing, the height of the raised portions 12Cm is greater on the second lateral surface SS2 side than on the first lateral surface SS1 side. The height of raised portions 12Cm continuously varies from 0.001 mm to 10 mm, for example. Therefore, light which enters the light guiding element 12C at the first lateral surface SS1 side is not greatly refracted in the vicinity of the first lateral surface SS1. The light undergoes greater refraction as it propagates inside the light guiding element 12C toward the second lateral surface SS2 side. With such a configuration, the amount of light outgoing from the second principal surface MS2 is uniform between the first lateral surface SS1 side and the second lateral surface SS2 side.

The light guiding element 12C may be manufactured using a method disclosed in WO 2011/111697, for example. As disclosed in the above patent application, positively utilizing such a phenomenon that the structure of the porous alumina layer depends on the temperature in the anodization enables formation of a porous alumina layer in which regions having different minute structures (e.g., different depths of recessed portions) are arranged in a predetermined pattern. Specifically, in the step of providing an aluminum film formed on one principal surface of a support, providing a low heat conduction member that has a predetermined pattern on another principal surface of the support which is opposite to the one principal surface enables formation of a porous alumina layer in which regions having different minute structures are arranged in a pattern that corresponds to the pattern of the low heat conduction member. For example, the anodization is performed with an acrylic plate being placed on the rear surface of a support on which an aluminum film has been formed, the acrylic plate having a thickness which continuously increases from one of a pair of opposing lateral surfaces to the other lateral surface. As a result, a porous alumina layer is obtained in which the depth of recessed portions continuously increases from the one lateral surface to the other. This is because the anodization (growth of recessed portions) is further enhanced as the temperature in the anodization increases. By using the resultant porous alumina layer as a mold, the light guiding element 12C can be obtained. The entire disclosures of WO 2011/111697 are incorporated by reference in this specification.

Figure 5:
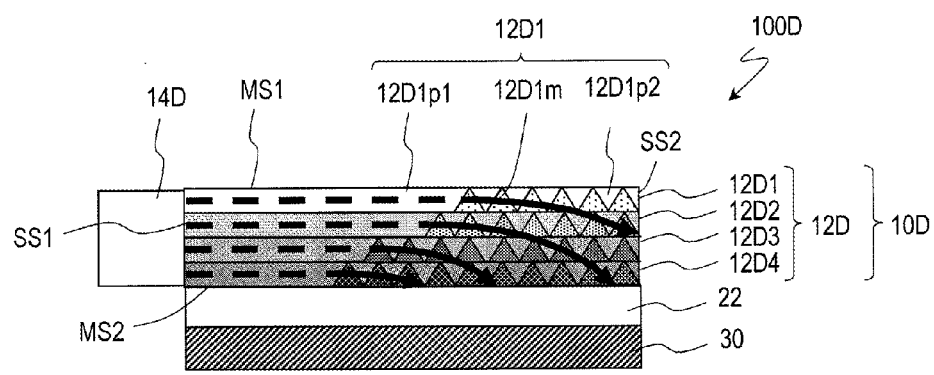
FIG. 5 A schematic cross-sectional view of a liquid crystal display device 100D of still another embodiment of the present invention.

Next, FIG. 5 shows a schematic cross-sectional view of the liquid crystal display device 100D of still another embodiment of the present invention. A lighting device 10D, which is included in the liquid crystal display device 100D shown in FIG. 5, includes a light guiding element 12D and a light source 14D. The light source 14D is, for example, a LED or CCFL as is the above-described light source 14.

The light guiding element 12D includes a plurality of light guiding layers 12D1, 12D2, 12D3, and 12D4 between the first principal surface MS1 and the second principal surface MS2, as does the light guiding element 12B shown in FIG. 3. The number of light guiding layers included in the light guiding element 12D is not limited to four but may be any number which is not less than two. Each of the plurality of light guiding layers 12D1, 12D2, 12D3, and 12D4 has a plurality of raised portions (e.g., raised portions 12D1m) which are two-dimensionally arranged in a region on the second lateral surface SS2 side. The plurality of raised portions are protruding from the second principal surface MS2 toward the first principal surface MS1. For example, the two-dimensional size of a plurality of raised portions 12D1m of the light guiding layer 12D1 is not less than 10 nm and not more than 500 nm. The distance between adjacent ones of the plurality of raised portions 12D1m is not less than 10 nm and not more than 500 nm. The gaps between the plurality of raised portions 12D1m are a plurality of recessed portions 12D1p2. A flat portion 12D1p1, in which the raised portions 12D1m are not provided, is configured likewise as the recessed portions 12D1p2. The two-dimensional size of a plurality of raised portions of the light guiding layer 12D2 is not less than 10 nm and not more than 500 nm. The distance between adjacent ones of the plurality of raised portions of the light guiding layer 12D2 is not less than 10 nm and not more than 500 nm. The gaps between the plurality of raised portions are a plurality of recessed portions.

Here, in the light guiding layer 12D1 that is closest to the first principal surface MS1, the gaps between the plurality of raised portions 12D1m, i.e., the recessed portions 12D1p2, are preferably filled with air from the viewpoint of antireflection, although the recessed portions 12D1p2 may be filled with a material whose refractive index is smaller than the refractive index n1 of the material of the raised portions 12D1m.

In the light guiding layer 12D2 that is provided immediately below the light guiding layer 12D1, the refractive index n2 of the material of the raised portions is greater than the refractive index n1 of the material of the raised portions 12D1m of the light guiding layer 12D1 (n2>n1). The refractive index of the material that fills the recessed portions of the light guiding layer 12D2 is generally equal to the refractive index n1 of the material of the raised portions 12D1m. Such a configuration realizes a structure in which the refractive index varies substantially continuously from the first principal surface MS1 side surface of the light guiding layer 12D1 to the second principal surface MS2 side surface of the light guiding layer 12D2. By configuring the light guiding layer 12D3 so as to satisfy the same relationship with respect to the light guiding layer 12D2 and configuring the light guiding layer 12D4 so as to satisfy the same relationship with respect to the light guiding layer 12D3, the light guiding element 12D is realized in which the refractive index varies substantially continuously from the first principal surface MS1 toward the second principal surface MS2.

In the light guiding element 12D, in each of the plurality of light guiding layers 12D1, 12D2, 12D3, and 12D4, the raised portions are provided only in a portion on the second lateral surface SS2 side, as is not the case with the light guiding element 12B shown in FIG. 3. The area in which the raised portions are provided expands farther from the second lateral surface SS2 side toward the first lateral surface SS1 side, in order of the plurality of light guiding layers 12D1, 12D2, 12D3, and 12D4, i.e., as the level lowers from the first principal surface MS1 side toward the second principal surface MS2 side. In other words, the number of a plurality of raised portions included in the light guiding element 12D is greater on the second lateral surface SS2 side than on the first lateral surface SS1 side. Therefore, in the light guiding element 12D, the volume proportion of the plurality of raised portions is greater on the second lateral surface SS2 side than on the first lateral surface SS1 side. As a result, in the light guiding element 12D, the amount of light outgoing from the second principal surface MS2 is uniform between the first lateral surface SS1 side and the second lateral surface SS2 side, as in the light guiding element 12C shown in FIG. 4.

Herein, each of the plurality of light guiding layers 12D1, 12D2, 12D3, and 12D4 has a region in which raised portions are not provided, although the present invention is not limited to this example. The same effects can also be achieved when each light guiding layer has the same structure as that of the light guiding element 12C.

In the above-described example, light enters from the first lateral surface SS1 of each light guiding element. However, light may enter not only from the first lateral surface SS1 of the light guiding element but also from the second lateral surface SS2. In this case, the light guiding element may be configured such that the volume proportion of the plurality of raised portions is greater in a middle region between the first lateral surface SS1 side and the second lateral surface SS2 side. For example, the light guiding element may be configured such that the height of the plurality of raised portions is greater in a middle region between the first lateral surface SS1 side and the second lateral surface SS2 side, or such that the number of the plurality of raised portions is greater in a middle region between the first lateral surface SS1 side and the second lateral surface SS2 side.

The light guiding element is commonly a light guiding element which has the shape of a plate (light guide plate), in which light incoming from one of opposing lateral surfaces of the light guide plate (first lateral surface SS1) propagates to the other lateral surface (second lateral surface SS2). In this process, the direction of the light propagating in the light guide plate is perpendicular to the first lateral surface and the second lateral surface. The light guiding element of the present invention is not limited to this example but may be applicable to light guiding elements which have various shapes.

Figure 6:
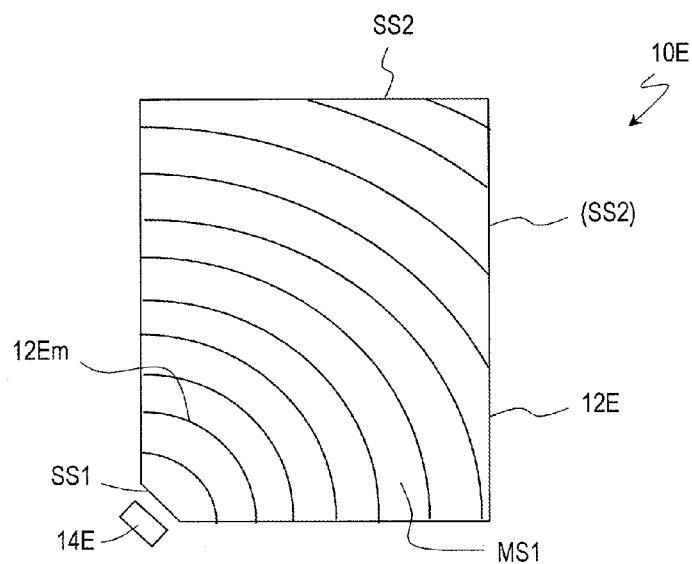
FIG. 6 A schematic plan view of a lighting device 10E of still another embodiment of the present invention.

FIG. 6 shows a schematic plan view of a lighting device 10E of still another embodiment of the present invention. The lighting device 10E includes a light guiding element 12E and a light source 14E. The light source 14E is, for example, a LED.

The first principal surface MS1 and the second principal surface MS2 of the light guiding element 12E have a generally rectangular shape, in which one of the corners is cut away. The light source 14E is provided so as to emit light toward the lateral surface at the cut-away corner (here, the first lateral surface SS1). The light guiding element 12E allows the light to propagate toward the second lateral surface SS2 (here, any of two lateral surfaces that form a corner which is diagonally opposite to the cut-away corner). In the case where the plurality of raised portions shown in FIG. 4 are provided in this light guiding element 12E, the plurality of raised portions may be arranged such that contour lines which represent the distribution of the height of the raised portions are identical with arcs 12Em which are generally concentric about the light source 14E in FIG. 6. In the case where the plurality of raised portions shown in FIG. 5 are provided in this light guiding element 12E, the plurality of raised portions may be arranged such that contour lines which represent the distribution of the number of the plurality of raised portions are identical with arcs 12Em which are generally concentric about the light source 14E in FIG. 6. Thus, the light guiding elements of the embodiments of the present invention are applicable to a variety of known light guiding elements.

INDUSTRIAL APPLICABILITY

Embodiments of the present invention are widely applicable to a light guiding element, and a lighting device and display device which include the light guiding element.

REFERENCE SIGNS LIST 10, 10A, 10B, 10C, 10D, 10E lighting device
12, 12A, 12B, 12C, 12D, 12E light guiding element (light guide plate)
12Am, 12B1m, 12B2m, 12Cm, 12D1m, 12D2m raised portion
12Ap, 12B1p, 12B2p, 12Cp, 12D1p2 recessed portion
12B1, 12B2, 12B3, 12B4 light guiding layer
12D1, 12D2, 12D3, 12D4 light guiding layer
22 adhesive layer
30 reflective liquid crystal display panel
100, 100A, 100B, 100C, 100D reflective liquid crystal display device

The invention claimed is:

1. A display device, comprising:
a lighting device having a light source;
a display panel; and
a light guiding element having a first principal surface, a second principal surface which opposes the first principal surface, a first lateral surface which intersects with the first principal surface and the second principal surface, and a second lateral surface which opposes the first lateral surface, the light guiding element being capable of allowing light incoming from the first lateral surface to propagate between the first principal surface and the second principal surface,
wherein the light guiding element includes a portion in which a refractive index varies substantially continuously from the first principal surface toward the second principal surface,
the light source is positioned so as to emit light toward the first lateral surface of the light guide element, and
the lighting device is provided on a viewer side of the display panel.

2. The display device of claim 1, wherein the light guiding element has a plurality of raised portions which are two-dimensionally arranged between the first principal surface and the second principal surface.

3. The display device of claim 2, wherein a two-dimensional size of the plurality of raised portions is not less than 10 nm and not more than 500 nm, and a distance between adjacent ones of the plurality of raised portions is not less than 10 nm and not more than 500 nm.

4. The display device of claim 2, wherein the plurality of raised portions are protruding from the second principal surface toward the first principal surface.

5. The display device of claim 2, wherein gaps between adjacent raised portions are filled with a material whose refractive index is lower than that of a material of the plurality of raised portions.

6. The display device of claim 2, wherein gaps between plural ones of the plurality of raised portions which are provided on a side that is closest to the first principal surface are filled with air.

7. The display device of claim 2, comprising a plurality of light guiding layers between the first principal surface and the second principal surface, the plurality of light guiding layers including a first light guiding layer and a second light guiding layer which is provided on a second principal surface side of the first light guiding layer,
wherein each of the first and second light guiding layers has the plurality of raised portions, and a refractive index n1 of the raised portions of the first light guiding layer is smaller than a refractive index n2 of the raised portions of the second light guiding layer.

8. The display device of claim 2, wherein a volume proportion of the plurality of raised portions is greater on the second lateral surface side than on the first lateral surface side.

9. The display device of claim 8, wherein a height of the plurality of raised portions is greater on the second lateral surface side than on the first lateral surface side.

10. The display device of claim 8, wherein a number of the plurality of raised portions is greater on the second lateral surface side than on the first lateral surface side.

11. A light guiding element having a first principal surface, a second principal surface which opposes the first principal surface, a first lateral surface which intersects with the first principal surface and the second principal surface, and a second lateral surface which opposes the first lateral surface, the light guiding element being capable of allowing light incoming from the first lateral surface to propagate between the first principal surface and the second principal surface,
wherein the light guiding element includes a portion in which a refractive index varies substantially continuously from the first principal surface toward the second principal surface, wherein the light guiding element has a plurality of raised portions which are two-dimensionally arranged between the first principal surface and the second principal surface and wherein a volume proportion of the plurality of raised portions is greater on the second lateral surface side than on the first lateral surface side.

12. The light guiding element of claim 11, wherein a two-dimensional size of the plurality of raised portions is not less than 10 nm and not more than 500 nm, and a distance between adjacent ones of the plurality of raised portions is not less than 10 nm and not more than 500 nm.

13. The light guiding element of claim 11, wherein the plurality of raised portions are protruding from the second principal surface toward the first principal surface.

14. The light guiding element of claim 11, wherein gaps between adjacent raised portions are filled with a material whose refractive index is lower than that of a material of the plurality of raised portions.

15. The light guiding element of claim 11, wherein gaps between plural ones of the plurality of raised portions which are provided on a side that is closest to the first principal surface are filled with air.

16. The light guiding element of claim 11, comprising a plurality of light guiding layers between the first principal surface and the second principal surface, the plurality of light guiding layers including a first light guiding layer and a second light guiding layer which is provided on a second principal surface side of the first light guiding layer, wherein each of the first and second light guiding layers has the plurality of raised portions, and a refractive index n1 of the raised portions of the first light guiding layer is smaller than a refractive index n2 of the raised portions of the second light guiding layer.

17. The light guiding element of claim 16, wherein a height of the plurality of raised portions is greater on the second lateral surface side than on the first lateral surface side.

18. The light guiding element of claim 16, wherein a number of the plurality of raised portions is greater on the second lateral surface side than on the first lateral surface side.

* * * * *